(12) United States Patent
Ukpai et al.

(10) Patent No.: US 7,905,538 B2
(45) Date of Patent: Mar. 15, 2011

(54) ACTIVE MATERIAL BASED CONCEALMENT DEVICES FOR SEAMS

(75) Inventors: Ukpai I. Ukpai, West Bloomfield, MI (US); Alan L. Browne, Grosse Pointe, MI (US); Mark A. Kramarczyk, Sterling Heights, MI (US); Nancy L. Johnson, Northville, MI (US); John C. Ulicny, Oxford, MI (US); Gary L. Jones, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 417 days.

(21) Appl. No.: 11/848,488

(22) Filed: Aug. 31, 2007

(65) Prior Publication Data

US 2009/0058130 A1  Mar. 5, 2009

(51) Int. Cl.
*B60J 10/08* (2006.01)
(52) U.S. Cl. .................................... 296/146.9
(58) Field of Classification Search .............. 296/146.9
See application file for complete search history.

(56) References Cited

U.S. PATENT DOCUMENTS

| | | | |
|---|---|---|---|
| 5,390,974 A | 2/1995 | Theodorakakos | |
| 5,979,828 A | 11/1999 | Gruensfelder et al. | |
| 6,702,301 B1 | 3/2004 | Davies et al. | |
| 6,979,050 B2 | 12/2005 | Browne et al. | 296/180.5 |
| 7,118,652 B2 | 10/2006 | McKnight et al. | 196/180.5 |
| 7,331,616 B2* | 2/2008 | Brei et al. | 292/100 |
| 7,478,845 B2* | 1/2009 | Mankame et al. | 292/201 |
| 7,500,704 B2* | 3/2009 | Herrera et al. | 296/37.12 |
| 7,548,010 B2* | 6/2009 | Browne et al. | 310/307 |
| 7,556,117 B2* | 7/2009 | Browne et al. | 180/274 |
| 7,607,717 B2* | 10/2009 | Browne et al. | 296/180.1 |
| 7,631,915 B2* | 12/2009 | Browne et al. | 296/1.02 |
| 2005/0198907 A1* | 9/2005 | McKnight et al. | 49/475.1 |
| 2005/0199455 A1* | 9/2005 | Browne et al. | 188/266.4 |
| 2005/0263359 A1* | 12/2005 | Mankame et al. | 188/266.1 |
| 2006/0186700 A1 | 8/2006 | Browne et al. | 96/187.01 |
| 2007/0071575 A1 | 3/2007 | Rudduck et al. | 411/386 |
| 2008/0034750 A1* | 2/2008 | Gao et al. | 60/527 |
| 2008/0100071 A1* | 5/2008 | Browne et al. | 292/341.17 |
| 2008/0100092 A1* | 5/2008 | Gao et al. | 296/146.11 |

(Continued)

FOREIGN PATENT DOCUMENTS

DE   112005000562 T5   1/2007

OTHER PUBLICATIONS

German Office Action Dated Dec. 2, 2009.

*Primary Examiner* — Kiran B. Patel
(74) *Attorney, Agent, or Firm* — Cantor Colburn LLP (57) ABSTRACT

A device for concealing a seam between a first surface and a second surface includes a moveable body fixedly attached to a selected one of the first surface and the second surface, wherein the moveable body is configured to transition between a first position and a second position to conceal and expose the seam, and an active material in operative communication with the moveable body, wherein the active material is configured to undergo a change in at least one property upon receipt of an activation signal, wherein the change in at least one property is effective to transition the moveable body from the first position to the second position.

13 Claims, 7 Drawing Sheets

U.S. PATENT DOCUMENTS

| | | | |
|---|---|---|---|
| 2008/0120911 A1* | 5/2008 | Browne et al. | 49/352 |
| 2008/0216285 A1* | 9/2008 | Browne et al. | 16/110.1 |
| 2008/0217927 A1* | 9/2008 | Browne et al. | 292/28 |
| 2008/0217941 A1* | 9/2008 | Chernoff et al. | 296/1.02 |
| 2008/0223158 A1* | 9/2008 | Johnson et al. | 74/70 |
| 2009/0218859 A1* | 9/2009 | Lawall et al. | 297/216.1 |
| 2009/0230275 A1* | 9/2009 | Lawall et al. | 248/429 |
| 2009/0236884 A1* | 9/2009 | Lawall et al. | 297/217.3 |
| 2010/0019541 A1* | 1/2010 | Browne et al. | 296/202 |
| 2010/0032982 A1* | 2/2010 | Browne et al. | 296/180.5 |

* cited by examiner

ACTIVE MATERIAL BASED CONCEALMENT DEVICES FOR SEAMS

BACKGROUND

The present disclosure generally relates to concealment devices for covering and/or filling the seams found between two surfaces of a vehicle, and in particular concealment devices having active materials.

Motor vehicles and other transportation means such as airplanes, busses, and trains have multiple movable (i.e., swingable, slidable, or the like) surfaces. In motor vehicles, for instance, such movable surfaces can include body panels, such as doors, hoods, trunks, tailgates, sunroofs, glove boxes, and the like. Currently, a seam (i.e. gap or opening) exists between the moveable surface, such as a sliding sunroof, and a non-movable surface, such as the vehicle roof. This seam can be partly attributed to the limited manufacturing tolerances of the panels. Currently, the seams impact vehicle aerodynamics, as well as styling design and aesthetics.

Accordingly, there is a need for concealment devices that can cover and/or fill the seams between two or more surfaces of a vehicle. It is further desirable that such concealment devices help improve aerodynamics as well as the overall aesthetic appeal of the vehicle.

BRIEF SUMMARY

Disclosed herein is an active material based concealment assembly in accordance with an exemplary embodiment. In one embodiment, a device for concealing a seam between a first surface and a second surface includes a moveable body fixedly attached to a selected one of the first surface and the second surface, wherein the moveable body is configured to transition between a first position and a second position to conceal and expose the seam, and an active material in operative communication with the moveable body, wherein the active material is configured to undergo a change in at least one property upon receipt of an activation signal, wherein the change in at least one property is effective to transition the moveable body from the first position to the second position.

In another embodiment, a device for concealing a seam between a fixed panel and a moveable panel of a vehicle includes, a moveable body fixedly attached to the fixed panel, wherein the moveable body is configured to transition between a first position and a second position, wherein the first position exposes the seam when the moveable panel is in an open position and the second position conceals the seam when the moveable panel is in a closed position, and an active material in operative communication with the moveable body, wherein the active material is configured to undergo a change in at least one property upon receipt of an activation signal, wherein the change in at least one property is effective to transition the moveable body from the first position to the second position.

A method of concealing a seam between a first surface and a second surface, the method includes positioning a moveable body fixedly attached to a selected one of the first surface and the second surface, wherein the moveable body is configured to transition between a first position and a second position to conceal and expose the seam, and activating an active material in operative communication with the moveable body, wherein the active material is configured to undergo a change in at least one property upon receipt of an activation signal, wherein the change in at least one property is effective to transition the moveable body from the first position to the second position.

BRIEF DESCRIPTION OF THE DRAWINGS

Referring now to the figures, which are exemplary embodiments and wherein like elements are numbered alike.

DETAILED DESCRIPTION

Concealment devices for covering and/or filling seams between vehicle surfaces and methods of their use are described herein. Further, the concealment devices as disclosed herein advantageously employ the use of active materials. The concealment devices comprise one or more active materials which permit the concealment devices to reversibly cover and/or fill a seam between vehicle surfaces in response to a change in a property of the active materials upon receipt of an activation signal. The term "surfaces" as used herein generally refers to any surfaces of a vehicle (interior or exterior) that come together to form a seam (i.e., gap, opening, space, and the like) for which concealment is desirable. For example, without limitation, where a door panel, trunk lid, hood, or tailgate meets the vehicle body. In another example, where a sunroof, moonroof, or the like, meets the vehicle roof. In yet another example, where a glove box and dashboard come together. The term "active material" as used herein generally refers to a material that exhibits a reversible change in at least one property such as dimension, shape, phase, orientation, stiffness, and the like upon application of an activation signal. Suitable active materials include, without limitation, shape memory polymers (SMP), shape memory alloys (SMA), ferromagnetic shape memory alloys (MSMA), piezoelectric materials, electroactive polymers (EAP), magnetorheological (MR) elastomers, electrorheological (ER) elastomers, and the like. Depending on the particular active material, the activation signal can take the form of, without limitation, an electric current, an electric field (voltage), a temperature change, a magnetic field, a mechanical loading or stressing, and the like.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Furthermore, all ranges disclosed herein are inclusive of the endpoints and independently combinable.

In an exemplary embodiment, an active material based concealment device comprises a moveable body and an active material in operative communication with the moveable body. The active material is configured to undergo a change in at least one property upon receipt of an activation signal. The change in at least one property is effective to conceal a seam, gap, space, or the like between a first and a second surface. The change in the at least one property of the active material affects various features of the moveable body of the concealment device such as, but not limited to, shape, dimension, location, orientation, stiffness, and the like, resulting in transition of the moveable body from a concealing position or an exposing position relative to the seam. The terms first position and second position will be used to refer to the positions of the moveable body and will refer to a selected one of the concealing or exposing positions of the device depending upon the configuration of the active material. In this manner, the device is adjustable and concealment/exposure of the seam changes with the change in at least one property of the active material. The change may be on-demand or based on sensor input as to operational conditions. Furthermore, an activation device can be in operative communication with the active material, wherein the activation device is configured to selectively provide the activation signal to the active material.

The active material of the concealment device can be in remote operative communication with the device or the active material can be integrated into the device. For example, the active material can be disposed on a surface of the moveable body, embedded within the surface of the moveable body, embedded within the moveable body itself, or connected externally to the surface of the concealment device. Moreover, the concealment device may comprise one or more active materials applied as a coating, a layer, sections such as active material strips, to at least one surface of the moveable body. Alternatively, the moveable body of the concealment device may be comprised completely of the active material. Further, different active materials can be applied to the surface of the moveable body, wherein the different active materials are applied adjacent to one another. In another embodiment, the active material may comprise a composite of different shape memory materials. The active material provides the concealment device with a shape changing capability that can be actively-tuned to a particular application, as will be described in greater detail below. The active materials described may have a substantially straight shape at room temperature and, a curved shape (i.e. curvilinear shape) when heated above a temperature range that may be generally encountered during vehicle operation or equipment/appliance use (in this way precluding actively controlled activation).

The active material based concealment device may be any of a variety of configurations, including but not limited to, a flexible flap, a rigid plate, a morphable tube, a shaped hollow cross section, and the like, wherein the configuration is suitable for concealing seams between two vehicle surfaces in exterior or interior of the vehicle.

The active material may change at least one property in response to an activation signal, and revert back to the original state of the at least one property upon discontinuation of the activation signal, or, for the classes of active materials that do not automatically revert upon discontinuation of the activation signal, alternative means can be employed to revert the active materials to their original state. The above-listed suitable active materials for use in the concealment devices will be discussed in greater detail further below.

Coupled to and in operative communication with the active material based concealment device is an activation device, which can be linked to a control system. The activation device is operable to selectively provide an activation signal to the active material based concealment device and change a feature of the active material based concealment device by changing at least one property of the active material. For example, the active material can retract or extend the active material based concealment device depending on whether one pushes a button to open the sunroof of the vehicle. The activation device, on demand, provides the activation signal or stimulus to the active material of the active material based concealment device to cause the change in one or more feature of at least a portion of the device. In one embodiment, the change in feature generally remains for the duration of the applied activation signal. Upon discontinuation of the activation signal, the active material generally reverts to a deactivated form and returns substantially to the original at least one property, thus reverting the active material based concealment device to the original feature and/or features. Conversely, if the external force and/or load is being applied at the time of deactivation, the property will lock in the new desired form upon deactivation. In this manner, reversibility and multiple resets of the active material based concealment assemblies can advantageously occur.

The activation signal provided by the activation device can include a heat signal, a magnetic signal, an electrical signal, a pneumatic signal, a mechanical signal, a chemical signal, and the like, and combinations comprising at least one of the foregoing signals, with the particular activation signal dependent on the materials and/or configuration of the active material. For instance, a heat signal may be applied for changing the property of the active material fabricated from SMA and/or SMP. An electrical signal may be applied for changing the property of the active material fabricated from EAP and/or electronic EAPs. A magnetic field may be applied (removed or changed) for changing the property of the active material fabricated from magnetostrictive materials such as MSMA and MR elastomers or through another kind of control system.

The activation device can be operated in a variety of ways. For example, in one embodiment, use of the remote key fob to lock/unlock a vehicle door could also be configured to initiate the activation signal and cause concealing/exposing of the seam. Likewise, a wireless signal transmitter in the key fob in combination with an activation device sensor could be used to automatically activate the active material when the key fob is brought into physical proximity to the active material based concealment device, thereby eliminating the need to press key fob buttons. In another embodiment, the activation signal could be manually activated. For example, inserting the vehicle key into the door lock or using an interior door handle could activate the activation signal. Similarly, a push button or the like could be disposed adjacent the seam, wherein depressing the push button activates the activation signal in order to expose the seam. In any of the above methods of activating the active material, the activation signal can be turned off by time-out of a timer in communication with the active material based concealment device, or through a sensor in operative communication with the device, or through the occurrence of some event, for example, opening and closing the vehicle door to deactivate the activation signal and return the device to the position wherein the seam is concealed.

Whatever the mode of activation, it is advantageous that the active material based concealment device cover the seam when in the passive mode, i.e., when there is no power or activation signal to the device. When the device is concealing the seam, and no activation signal is being applied to the active material, then no power is required for the continued concealment of the seam. In other words, the only power required by the active material based concealment device is for the short duration in which the device must expose the seam, such as for the opening of a door in the case of a door panel. If, however, for some reason the vehicle component must be exposed for a longer than normal duration, or if the seam is located between two surfaces in which prolonged exposure is required, for instance between the vehicle roof and sunroof, then a zero-power hold mechanism can be added to the active material based concealment device. The term "zero-power hold mechanism" is intended to mean any device capable of holding the moveable body in the exposed position, i.e., exposing the seam, after the activation signal has been deactivated and includes, without limitation, a latch, a lock, a stop, and the like. Upon release of the zero-power hold mechanism, the active material reverts back to the original at least one property. The embodiments described below are exemplary only and are not intended to be limited to any particular shape, size, dimension or configuration, material, or the like. Also the change in the at least one property of the active material can be obtained by activating (or deactivating) the signal and can revert back to the original state by deactivating (or activating) the signal, depending on the arrangement and default state of the active material based concealment device.

In another embodiment, the active material based concealment device includes at least one sensor in operative communication with the device and/or the active material, wherein the sensor is adapted to transmit signals indicative of at least one vehicle condition. A vehicle condition can mean when the vehicle is parked or in motion, or when a part or accessory of the vehicle transitions between conditions, for example when a door is open or closed. This embodiment may further comprise a controller that is operatively connected to the sensor and the activation device, wherein the controller is programmed and configured to cause the activation device to provide an activation signal to the active material when the sensor signals indicate a predetermined vehicle condition or a required configuration of the two surfaces. The magnitude of the changed attribute as well as its rate of change (or profile) can be determined by the control system.

The active material may comprise any of a variety of active materials, including but not limited to shape memory materials, e.g., shape memory alloys, shape memory polymers, and electroactive polymers, polymer metal composites, conductive polymers, and piezoelectric material, magnetorheological (MR) compositions, such as MR elastomers, and other like materials that can exhibit a change in at least one property upon receiving an activation signal. The present disclosure is not intended to be limited to any particular active material and/or combinations of active materials. Likewise, the present disclosure is not intended to be limited to any particular activation signal. The particular activation signal or combinations thereof will depend on the sensitivity of the active material, and/or the preferred method and/or the rate or level of change (or profile) of the attribute required. For instance SMA can be activated thermally using Joule (electrical resistive) heating and/or convectively using fluid heating.

To better understand the various ways in which a concealment device can employ active materials to reversibly conceal a seam between two surfaces, it is necessary to understand the nature and mechanics of the desirable active materials. As previously mentioned, suitable active materials for the active material based concealment devices include, without limitation, shape memory alloys ("SMAs"; e.g., thermal and stress activated shape memory alloys and magnetic shape memory alloys (MSMA)), electroactive polymers EAPs) such as dielectric elastomers, ionic polymer metal composites (IPMC), piezoelectric materials (e.g., polymers, ceramics), and shape memory polymers (SMPs), shape memory ceramics (SMCs), baroplastics, magnetorheological (MR) materials (e.g., fluids and elastomers), electrorheological (ER) materials (e.g., fluids, and elastomers), composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baroplastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than other shape-memory materials. An example of an SMC is a piezoelectric material.

The ability of shape memory materials to return to their original shape upon the application or removal of external stimuli has led to their use in actuators to apply force resulting in desired motion. Active material actuators offer the potential for a reduction in actuator size, weight, volume, cost, noise and an increase in robustness in comparison with traditional electromechanical and hydraulic means of actuation. Ferromagnetic SMAs, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is often called the austenite finish temperature (Af). When the shape memory alloy is in the austenite phase and is cooled, it begins to change into the martensite phase, and the temperature at which this phenomenon starts is often referred to as the martensite start temperature (Ms). The temperature at which austenite finishes transforming to martensite is often called the martensite finish temperature (Mf). The range between As and Af is often referred to as the martensite-to-austenite transformation temperature range while that between Ms and Mf is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below As). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause the temperature-dependent transformations between the martensite and austenite phases.

The temperature at which the shape memory alloy remembers its high temperature form (i.e., its original, nonstressed shape) when heated can be adjusted by slight changes in the composition of the alloy and through thermomechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. The material will retain this shape after the stress is removed. In other words, stress induced phase changes in SMA are two way by nature; application of sufficient stress when an SMA is in its austenitic phase will cause it to change to its lower modulus martensitic phase. Removal of the applied stress will cause the SMA to switch back to its austenitic phase, and in so doing, recovering its starting shape and higher modulus.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses which can be as high as the inherent yield strength of the austenite material, sometimes up to three or more times that of the deformed martensite phase. For applications that require a large number of operating cycles, a strain of less than or equal to 4% or so of the deformed length of wire used can be obtained. MSMAs are alloys often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of H+ ion—the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-)crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes.

The shape memory material may also comprise a piezoelectric material. Also, in certain embodiments, the piezoelectric material can be configured as an actuator for providing rapid deployment. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage; with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat patch actuators which are constructed so as to bow into a concave or convex shape upon application of a relatively small voltage.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the sidechain, or on both chains within the molecules, can be used as candidates for the piezoelectric film. Examples of polymers include poly(sodium 4-styrenesulfonate) (PSS), poly S-119 (Poly(vinylamine) backbone azo chromophore), and their derivatives; polyfluorocarbons, including polyvinylidene fluoride (PVDF), its co-polymer vinylidene fluoride (VDF), trifluorethylene (TrFE), and their derivatives; polychlorocarbons, including poly(vinylchloride) (PVC), polyvinylidene chloride (PVC2), and their derivatives; polyacrylonitriles (PAN), and their derivatives; polycarboxylic acids, including poly (methacrylic acid (PMA), and their derivatives; polyureas, and their derivatives; polyurethanes (PUE), and their derivatives; bio-polymer molecules such as poly-L-lactic acids and their derivatives, and membrane proteins, as well as phosphate bio-molecules; polyanilines and their derivatives, and all of the derivatives of tetraamines; polyimides, and polyetherimide (PEI), and their derivatives; all of the membrane polymers; poly (N-vinyl pyrrolidone) (PVP) homopolymer, and its derivatives, and random PVP-co-vinyl acetate (PVAc) copolymers; and all of the aromatic polymers with dipole moment groups in the main-chain or side-chains, or in both the main-chain and the side-chains; as well as combinations comprising at least one of the foregoing.

Further, piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and combinations comprising at least one of the foregoing; and Group VIA and IIB compounds, such as CdSe, CdS, GaAs, $AgCaSe_2$, ZnSe, GaP, InP, ZnS, and combinations comprising at least one of the foregoing.

MR fluids are a class of smart materials whose rheological properties can rapidly change upon application of a magnetic field (e.g., property changes of several hundred percent can be effected within milliseconds), making them quite suitable in locking in (constraining) or allowing the relaxation of shapes/ deformations through a significant change in their shear strength, such changes being usefully employed with grasping and release of objects in embodiments described herein. Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and, potentially, the shape of the polymer structure are attained by changing the shear and compression/ tension moduli through varying the strength of the applied magnetic field. The MR polymers typically develop their stiffness when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state.

MR fluids exhibit a shear strength which is proportional to the magnitude of an applied magnetic field, wherein property changes of several hundred percent can be effected within milliseconds. Although these materials also face the issues packaging of the coils necessary to generate the applied field, they can be used as a locking or release mechanism, for example, for spring based grasping/releasing.

Suitable MR fluid materials include ferromagnetic or paramagnetic particles dispersed in a carrier, e.g., in an amount of about 5.0 volume percent (vol %) to about 50 vol % based upon a total volume of MR composition. Suitable particles include iron; iron oxides (including $Fe_2O_3$ and $Fe_3O_4$); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper.

The particle size should be selected so that the particles exhibit multiple magnetic domain characteristics when subjected to a magnetic field. Particle diameters (e.g., as measured along a major axis of the particle) can be less than or equal to about 1,000 micrometers (μm) (e.g., about 0.1 micrometer to about 1,000 micrometers), or, more specifically, about 0.5 to about 500 micrometers, and more specifically, about 1 to about 100 micrometers.

The viscosity of the carrier can be less than or equal to about 100,000 centipoise (cPs) (e.g., about 1 cPs to about 100,000 cPs), or, more specifically, about 250 cPs to about 10,000 cPs, or, even more specifically, about 500 cPs to about 1,000 centipoise. Possible carriers (e.g., carrier fluids) include organic liquids, especially non-polar organic liquids. Examples include oils (e.g., silicon oils, mineral oils, paraffin oils, white oils, hydraulic oils, transformer oils, and synthetic hydrocarbon oils (e.g., unsaturated and/or saturated)); halogenated organic liquids (such as chlorinated hydrocarbons, halogenated paraffins, perfluorinated polyethers and fluorinated hydrocarbons); diesters; polyoxyalkylenes; silicones (e.g., fluorinated silicones); cyanoalkyl siloxanes; glycols; and combinations comprising at least one of the foregoing carriers.

Aqueous carriers can also be used, especially those comprising hydrophilic mineral clays such as bentonite or hectorite. The aqueous carrier can comprise water or water comprising a polar, water-miscible organic solvent (e.g., methanol, ethanol, propanol, dimethyl sulfoxide, dimethyl fommamide, ethylene carbonate, propylene carbonate, acetone, tetrahydrofuran, diethyl ether, ethylene glycol, propylene glycol, and the like), as well as combinations comprising at least one of the foregoing carriers. The amount of polar organic solvent in the carrier can be less than or equal to about 5.0 vol % (e.g., about 0.1 vol % to about 5.0 vol %), based upon a total volume of the MR fluid, or, more specifically, about 1.0 vol % to about 3.0%. The pH of the aqueous carrier can be less than or equal to about 13 (e.g., about 5.0 to about 13), or, more specifically, about 8.0 to about 9.0.

When the aqueous carriers comprises natural and/or synthetic bentonite and/or hectorite, the amount of clay (bentonite and/or hectorite) in the MR fluid can be less than or equal to about 10 percent by weight (wt %) based upon a total weight of the MR fluid, or, more specifically, about 0.1 wt % to about 8.0 wt %, or, more specifically, about 1.0 wt % to about 6.0 wt %, or, even more specifically, about 2.0 wt % to about 6.0 wt %.

Optional components in the MR fluid include clays (e.g., organoclays), carboxylate soaps, dispersants, corrosion inhibitors, lubricants, anti-wear additives, antioxidants, thixotropic agents, and/or suspension agents. Carboxylate soaps include ferrous oleate, ferrous naphthenate, ferrous stearate, aluminum di- and tri-stearate, lithium stearate, calcium stearate, zinc stearate, and/or sodium stearate; surfactants (such as sulfonates, phosphate esters, stearic acid, glycerol monooleate, sorbitan sesquioleate, laurates, fatty acids, fatty alcohols, fluoroaliphatic polymeric esters); and coupling agents (such as titanate, aluminate, and zirconate); as well as combinations comprising at least one of the foregoing. Polyalkylene diols, such as polyethylene glycol, and partially esterified polyols can also be included.

Electrorheological fluids (ER) fluids are similar to MR fluids in that they exhibit a change in shear strength when subjected to an applied field, in this case a voltage rather than a magnetic field. Response is quick and proportional to the strength of the applied field.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated. Their major downside is that they require applied voltages approximately three orders of magnitude greater than those required by piezoelectrics. Electroactive polymers include those polymeric materials that exhibit piezoelectric, pyroelectric, or electrostrictive properties in response to electrical or mechanical fields.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material property(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that is has a maximum actuation pressure of about 0.05 megaPascals (MPa) and about 10 MPa, or, more specifically, about 0.3 MPa to about 3 MPa. In another embodiment, the polymer can be selected such that is has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying with time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes conductive greases (such as carbon greases and silver greases), colloidal suspensions, high aspect ratio conductive materials (such as carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids. These materials possess a very fast response capability, with the strain proportional to the strength of the applied magnetic field, and they return to their starting dimension upon removal of the field. However, these materials have maximum strains of about 0.1 to about 0.2 percent.

Figure 1A:
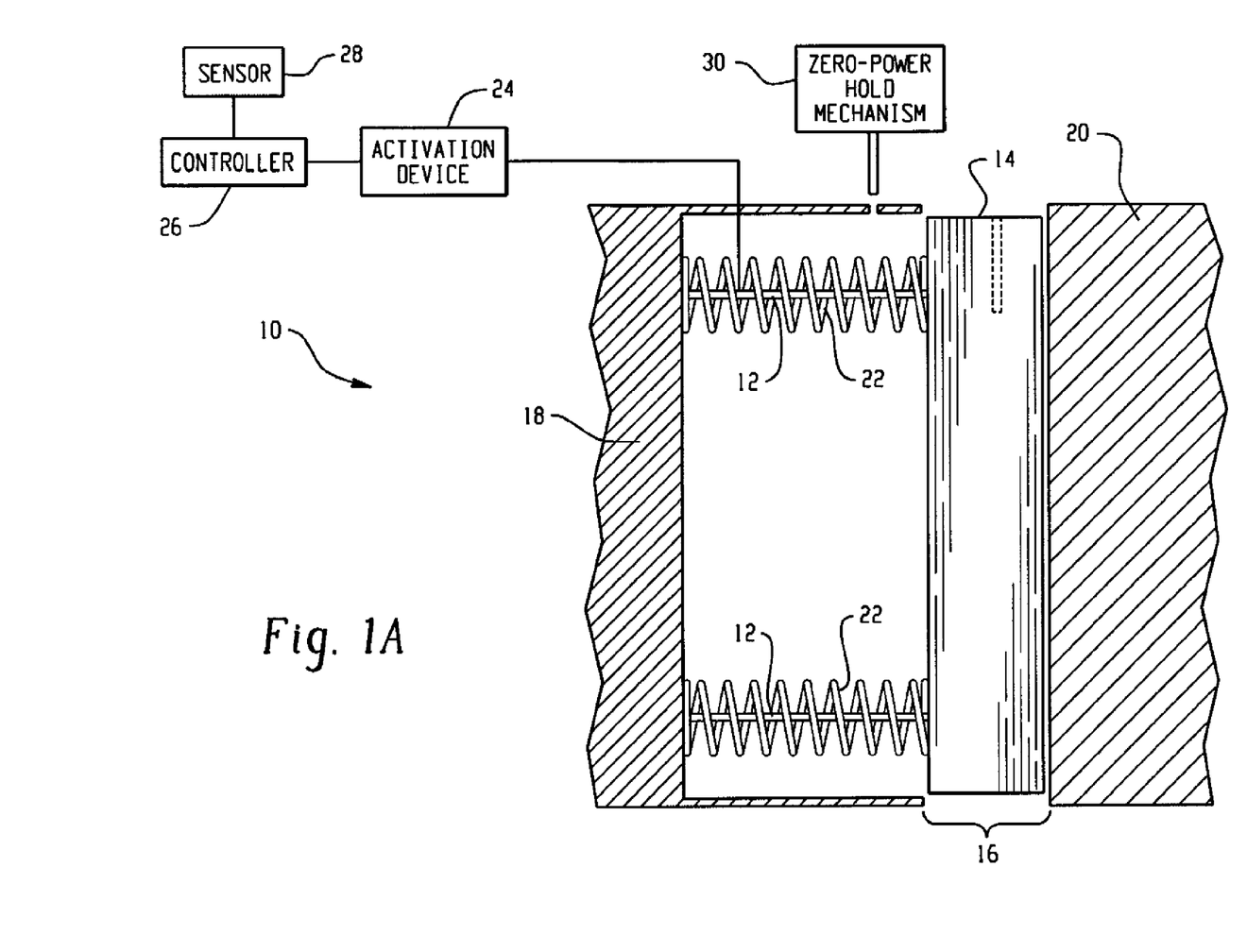
FIGS. 1A and 1B are perspective views of an active material based concealment device in (FIG. 1A) a position concealing a seam, and (FIG. 1B) in a position exposing the seam.
Figure 1B:
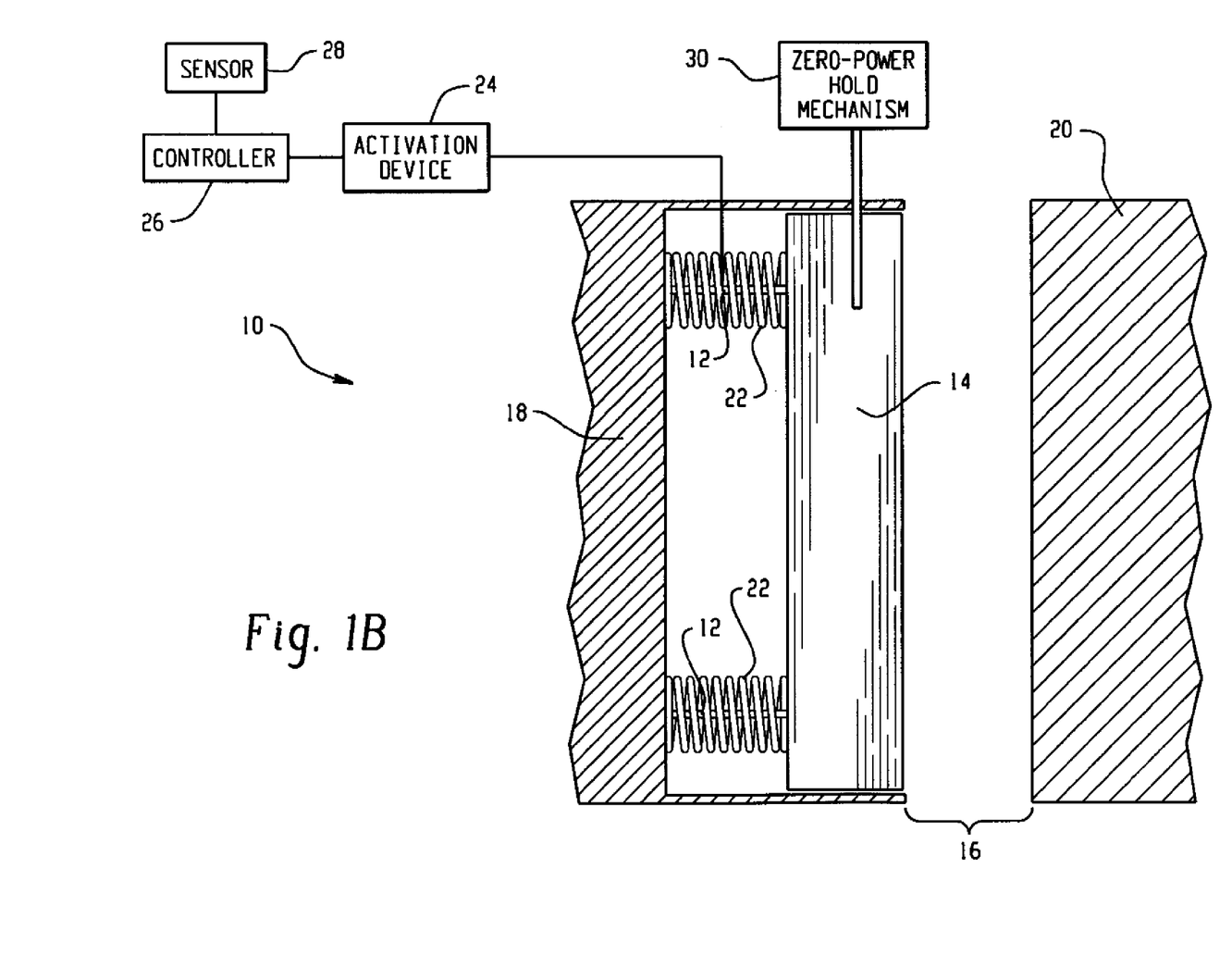

Referring now to FIG. 1, an exemplary embodiment of an active material based concealment device is shown and generally designated by reference numeral 10. The active material based concealment device 10 comprises an active material, such as SMA wires 12, which operatively connect a moveable body 14 to a first surface 18. The SMA wires 12 are configured to undergo a change in at least one property upon receipt of an activation signal. The change in at least one property is effective to transition the moveable body 14 from a first position (as shown in FIG. 1(a)) where a seam 16 between the first surface 18 and a second surface 20 is concealed, to a second position (as shown in FIG. 1(b)) where the seam 16 between the surfaces is exposed and the moveable body 14 is stowed in a groove, a cavity, or the like on the first surface 18. In another example, the moveable body 14 can be simply hidden behind the first surface 18. Bias mechanisms 22 are also in operative communication with the moveable body 14 and the first surface 18. The bias mechanisms 22 are configured to return the moveable body 14 to the first position, concealing the seam 16, after termination of the activation signal to the SMA wires 12. In this embodiment, the bias mechanisms 22 are in the form of bias springs.

An activation device 24 can be used to supply the activation signal to the SMA wires 12. Likewise, a controller 26 and a sensor 28 can be used in operative communication with the activation device 24 so that each component functions with each other and the active material based concealment device 10 to initiate the changes in at least one property of the SMA wires 12. In an optional embodiment, the deactivation of the SMA wires 12 follows the engaging of a zero-power hold mechanism 30, such as a stop, lock, catch, latch, or the like, which is configured to advantageously hold the moveable body 14 in a desired position; in this case the stowed position wherein the seam is exposed. When it is desired, the zero-power hold mechanism can be released and the bias mechanism 22 transitions the moveable body 14 to the first position wherein the seam is concealed.

In operation, the SMA wires 12, which are normally martensitic at room temperature, are heated to their austenitic state by electric resistance heating (electrical wires not shown) and contract in a length dimension. The contraction is effective to overcome the restraining force exerted by the bias mechanisms 22 mounted between the first surface 18 and the moveable body 14, and the moveable body 14 is transitioned from the seam concealing position to a stowed position, wherein the seam 16 is exposed. In this embodiment, without the zero-power hold mechanism 30, the SMA wires 12 would need to be continually heated even after the moveable body 14 is stowed in the second position to prevent reversion of the SMA wires 12 to the soft, martensitic state under which the bias mechanisms 22 would stretch the SMA wires and return the moveable body 14 to the deployed, first position.

Figure 2:
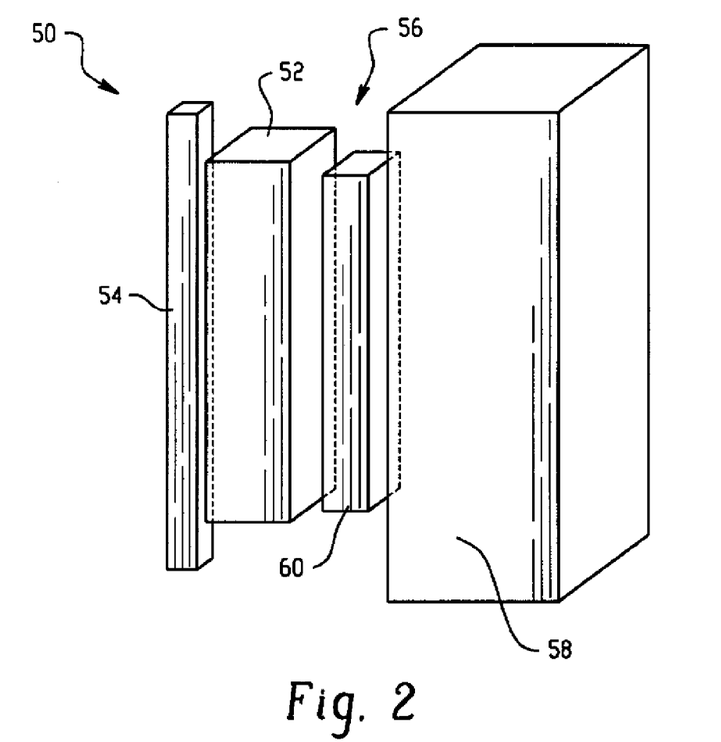
FIG. 2 is a perspective view of an active material based concealment device with a second moveable body.

FIG. 2 illustrates an alternative embodiment of an active material based concealment device 50. In this embodiment, the active material 52 is directly connected to one of the abutting surfaces, such as the first surface 54. The active material is configured to undergo a change in at least one property upon receipt of an activation signal, wherein the change in a property is effective to conceal the seam 56 formed by first surface 54 and the second surface 58. As can be seen in FIG. 2, the active material 52 in this embodiment is itself the moveable body, which transitions to reversibly conceal and expose the seam 56. In a variation of this embodiment, the active material based concealment device can further include a second body 60, which may or may not be formed of active material. The active material 52 can be the connecting material in which case it is connected to the second body 60, such that the second body 60 is the visible material concealing the seam 56. The second body 60 is advantageous for concealing seams where surface aesthetics may be important, such as between the exterior body panels of a vehicle. In this case, the second body 60 can be formed of a material that can be more easily painted and/or shaped to resemble the surrounding first and second surfaces, than the active material employed. In both embodiments, similarly as described in FIG. 1, the movement of the movable body, the active material and or both can be stowed in a groove on the first surface in the position when the seam is exposed. It can be made to contact the second surface in the position when the seam is concealed or made to move into a groove on the second surface.

Figure 3:
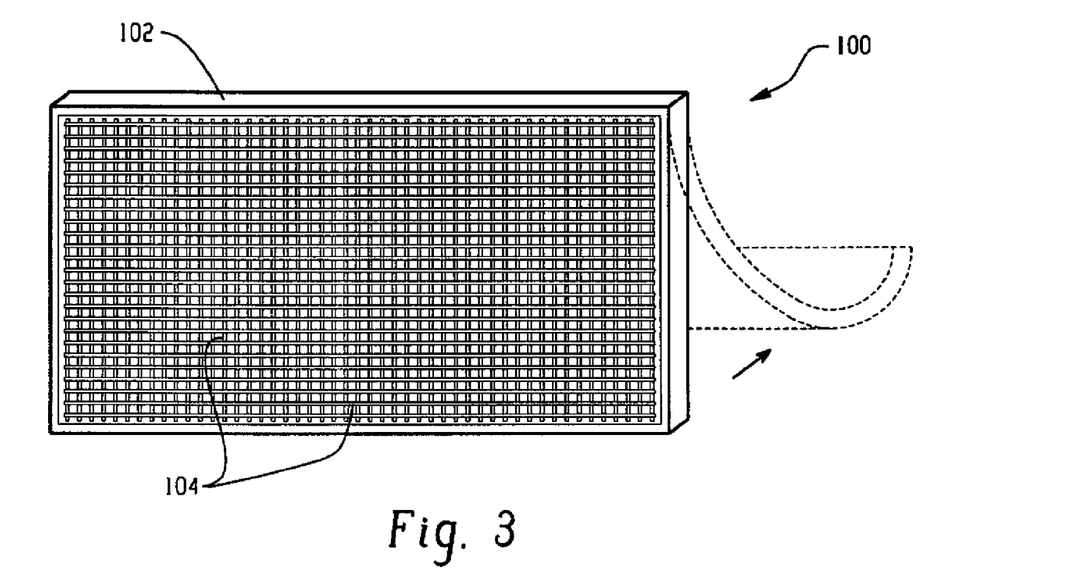
FIG. 3 is a perspective view of another exemplary embodiment of an active material based concealment device wherein the moveable body is comprised of active material.

Turning now to FIG. 3, another exemplary embodiment of an active material based concealment device 100 is illustrated. The active material based concealment device 100 can be used between two surfaces (not shown) wherein one surface is a swing panel. The active material based concealment device 100 includes an active material body 102, such as a concealing flap. One or more wires 104 are embedded in the active material body 102 to provide an activation means. Using SMP as an example, the active material body 102 is a SMP matrix, and the one or more wires 104 is an embedded grid of conductive wires for thermal activation of the matrix in the form of resistive heating. As stated earlier, a controller and/or sensor can be employed to cause a current to flow through the embedded one or more wires 104, for instance when a door is unlocked. The current flow causes the active material body 102, to undergo a change in at least one property. In the case of the SMP matrix, the change is a shape change, wherein the matrix curves outward from the seam (as indicated by the dashed lines in FIG. 3), assuming a trained higher temperature shape. The result is a exposing of the seam (not shown) and permission of the door or other swing panel to be opened. Further, when the door or other swing panel is closed and locked, the controller may discontinue the current and allow the active material body 102 to cool, thus straightening and concealing the gap.

In an alternative embodiment, the change in at least one property of the active material body 102 may be reversed such that heating is required to conceal the seam and reversion to low temperature will cause the seam to be exposed. In either case, the change in at least one property of the active material body 102 may remain upon discontinuing the activation signal. In another embodiment, the active material based concealment device 100 further includes a zero-power hold mechanism, such as a latch, lock, stop, or the like, as described above, to maintain the change in the active material body 102. Upon release of the zero-power hold mechanism, the active material body 102 reverts back to the original at least one property. In this manner, the active material body 102 may curve in response to the activation signal, maintain the curve until release of the zero-power hold mechanism; whereupon the active material body 102 will revert and straighten. Further, the active material based concealment device 100 can be restored and healed to a desired shape by heating the active material body 102 to the appropriate temperature. In this manner, an active material based concealment device that becomes inadvertently deformed, such as during an impact event, may be restored or healed to a desired shape by applying the appropriate temperature range. The selection of material comprising the active material body 102 will be determined by the desired application and will be known to those skilled in the art.

Figure 4:
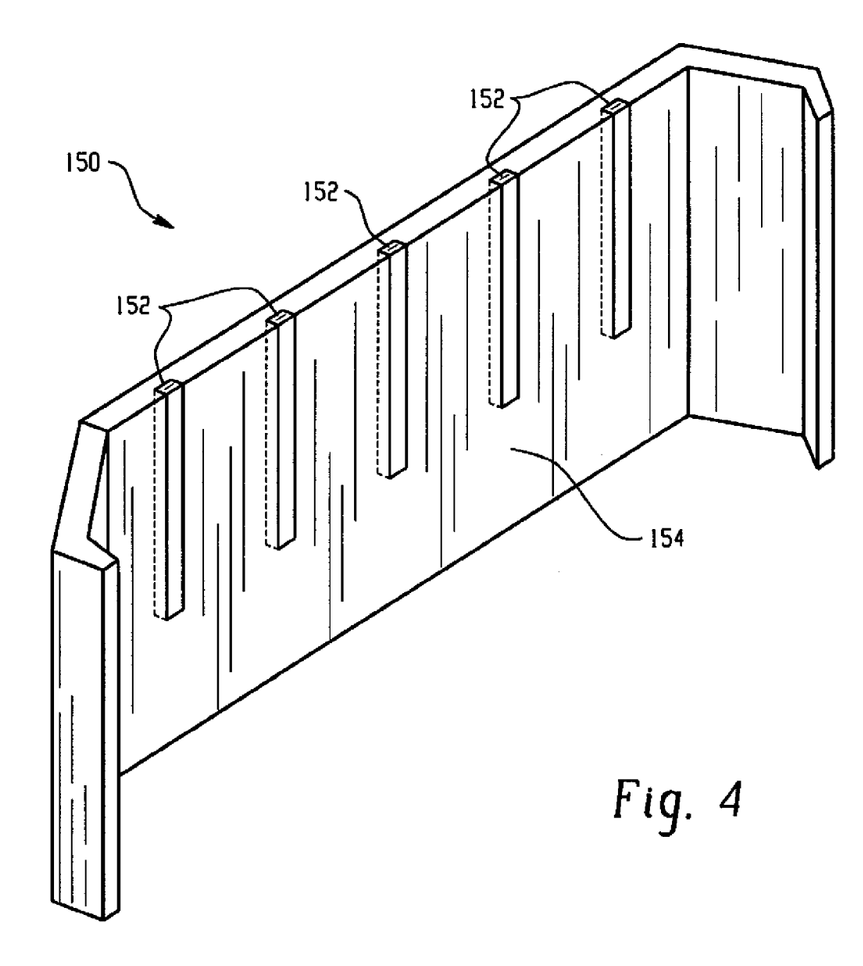
FIG. 4 is a perspective view of another embodiment of an active material based concealment device wherein the active material comprises sections embedded in the moveable body.

In FIG. 4, an alternative embodiment of an active material based concealment device 150 is shown, wherein the device includes strips and/or sections of active material embedded on a surface. The active material strips 152 are embedded, preferably but not necessarily at regular intervals, on the surface of a flexible matrix 154. In an alternate embodiment, the active material strips are embedded within the elastic matrix of the active material based concealment device. The placement of the active material is not limited to any particular configuration or pattern and will be determined by the desired application of the device. In one embodiment, the active material strips 152 are strips of SMA, wherein the active material strips 152 have a trained curved shape in the austenite phase (not shown in the FIG. 4 view). Again, the change in shape of the active material may be initiated by an activation signal transmitted by an activation device, controller, and/or sensor.

As a result of the change in phase, the stiffness of the SMA active material strips 152 in the austenite phase will be greater than the stiffness in the martensite phase. The number and size of the embedded active material strips 152 may be chosen such that when in the austenite phase the embedded active material causes the bulk of the active material concealment device 150 to deform. However, when the SMA active material strips 152 are in the martensite phase, the flexible matrix 154 of the active material concealment device 150 is sufficiently stiff to return the device to a straight configuration, and in doing so, straightening the SMA active material strips 152. As previously discussed, the active material concealment device 150 may be restored if deformed as a result of force, such as an impact or other event causing plastic deformation, by heating the SMA active material strips 152 to the austenite phase temperature.

Figure 5:
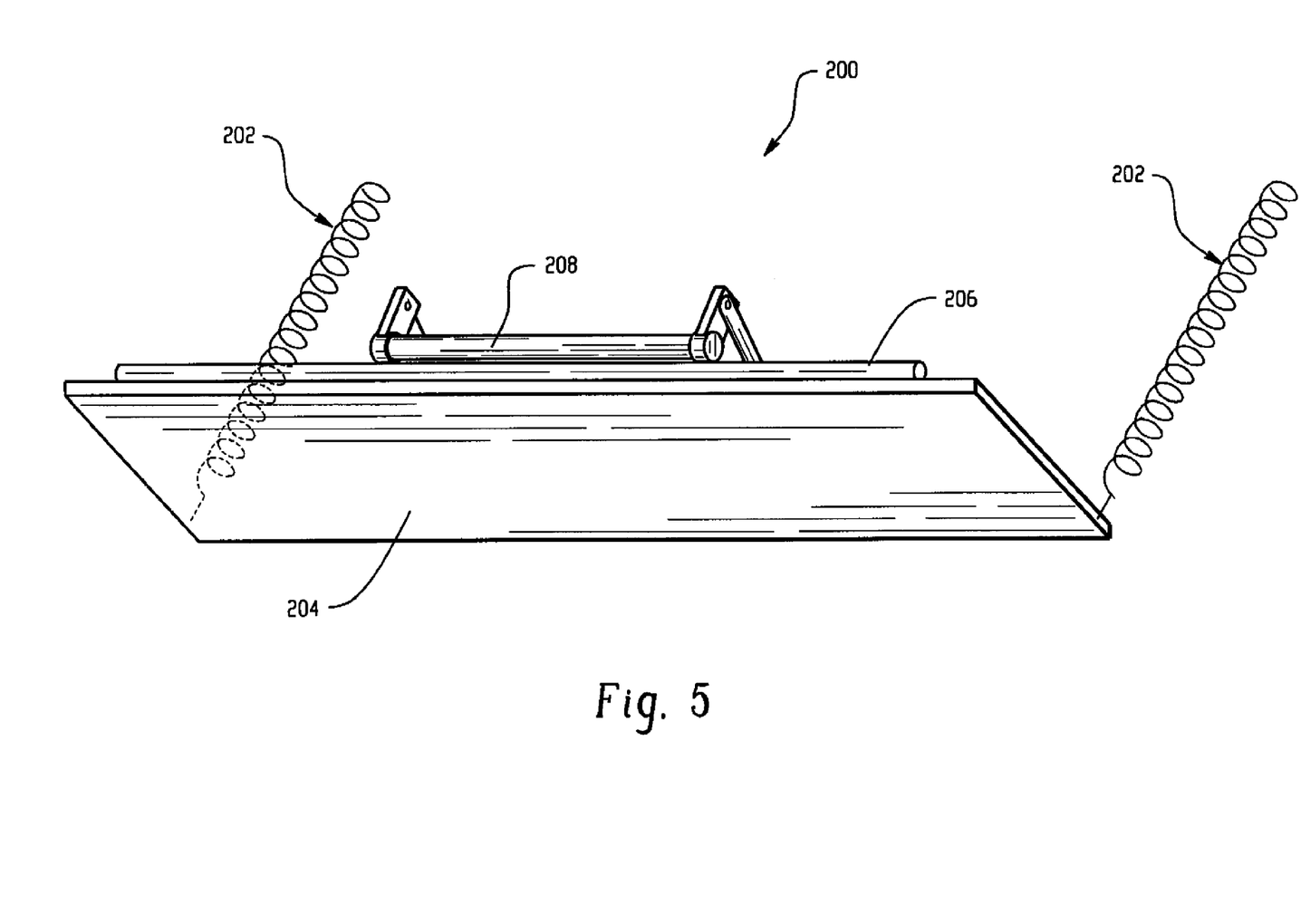
FIG. 5 is a perspective view of yet another exemplary embodiment of an active material based concealment device.

Turning now to FIG. 5, another exemplary embodiment of an active material based concealment device 200 is shown. The active material based concealment device 200 includes an active material 202 in the shape of, for instance, helical springs in operative communication with a concealment flap 204. In this embodiment, the active material 202 can be connected externally, either directly or remotely, to a surface of the concealment flap 204. The concealment flap 204 is further coupled to a hollow tube 206 such that the hollow tube is free to rotate about its axis. A spring mechanism 208 and the active material 202 are both coupled to the hollow tube 206 in an opposing fashion such that their respective tensions balance each other. In this manner, the rotation of the hollow tube 206 through external means will increase the tension in one while reducing tension in the other. When desired, on-demand or in response to a sensor input, tension in the spring mechanism 208 combined with the deactivated active material 202 results in rotation of the concealment flap 204 about the hollow tube 206 to cover a seam between two surfaces (not shown). To expose the seam, an activation signal is sent to the active material 202. For example, in the case of SMA wires, the temperature of the wires is raised through resistance heating to produce a phase change in the SMA from the martensite phase to the austenite phase. The SMA wires contract in a length dimension and increase in stiffness. The length contraction and stiffness increase is effective to rotate the concealment flap 204, i.e., rotation of the hollow tube 206 and stretching of the spring mechanism 208. Again, upon discontinuation of the activation signal, e.g., resistance heating, the active material 202 cools to the martensite phase and the stretched spring mechanism 208 returns the concealment flap 204 to a concealing position. In another embodiment, the change in at least one property of the active material 202 may remain upon discontinuing the activation signal. In this embodiment, the active material based concealment device 200 further includes a zero-power hold mechanism as described above to maintain the change in active material 202. Upon release of the zero-power hold mechanism, the active material based concealment device 200 reverts back to its original position of concealment and/or exposure depending on the configuration of the active material and the device's start position. As previously discussed, an activation device, controller and/or sensor may function with each other and the active material based concealment device 200 to initiate the changes in at least one property of the active material 202.

Figure 6A:
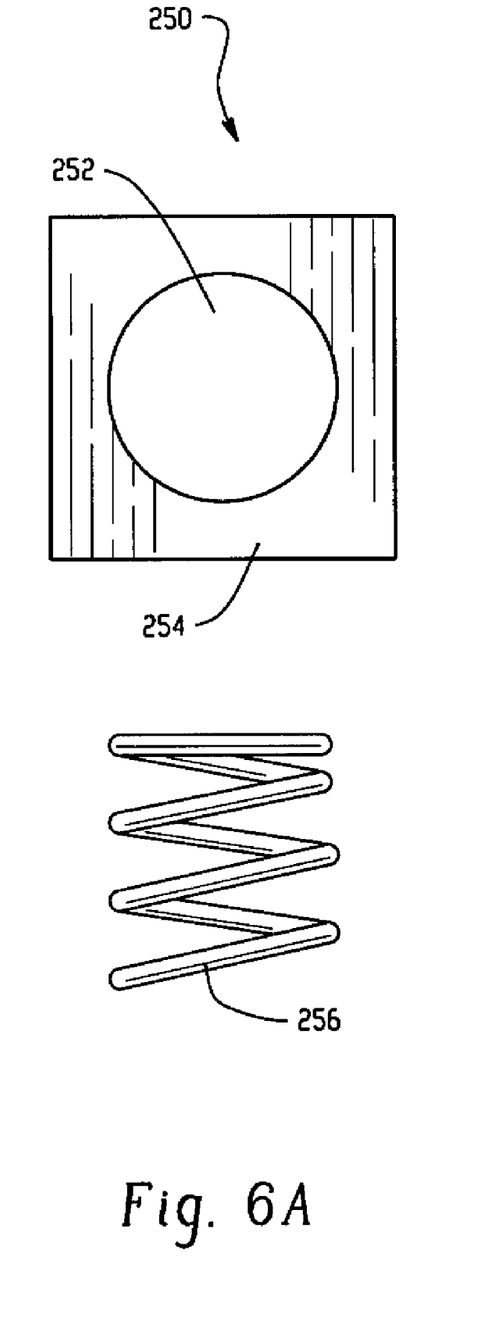
FIGS. 6A and 6B are perspective views of another embodiment of an active material based concealment device wherein the moveable body is an elastic matrix.
Figure 6B:
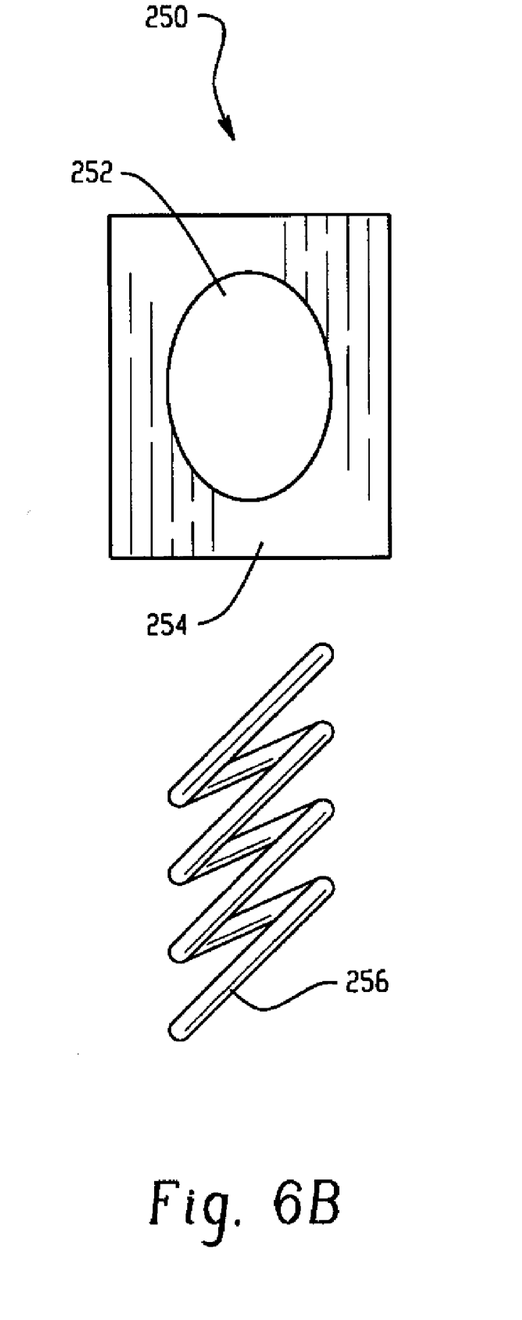

FIGS. 6A and 6B illustrate still another exemplary embodiment of an active material based concealment device 250. The active material based concealment device includes an active material 252, such as SMA, within an elastic matrix 254. A change in the at least one property of the active material 252 is effective to create a discrete profile change in the elastic matrix 254; from square to rectangular for example in the plane shown in FIGS. 6(a) and 6(b). With the transformation of the spring from martensite to austenite, and due to the way it is arranged in the elastic matrix, the shape change of the spring forces the elastic matrix to change shape, in this case, from square to rectangular. The transformation can be facilitated by changing one or more geometrical property(ies) of the spring coil 256, such as the wrap angle. The reverse transformation from austenite to martensite takes the shape back to the square shape in the plane shown. The seam is not shown in FIGS. 6(a) and 6(b) but this unit can be operatively connected to one of the abutting surfaces. In a different embodiment, a similar result could be achieved by using sheet material having a corrugated shape, for example a tubular member. The discrete profile change fills the seam created between two adjacent surfaces. This embodiment is particularly suitable to seam concealment between a vehicle door or other movable members and their adjacent stationary surfaces. By allowing the door or other member to reach its closed position prior to filling any void in the seam, the excess material created by the change in at least one property of the active material 252 remains in a concealed location within the door or adjacent surface, rather than bulging out of one of the surfaces.

Figure 7A:
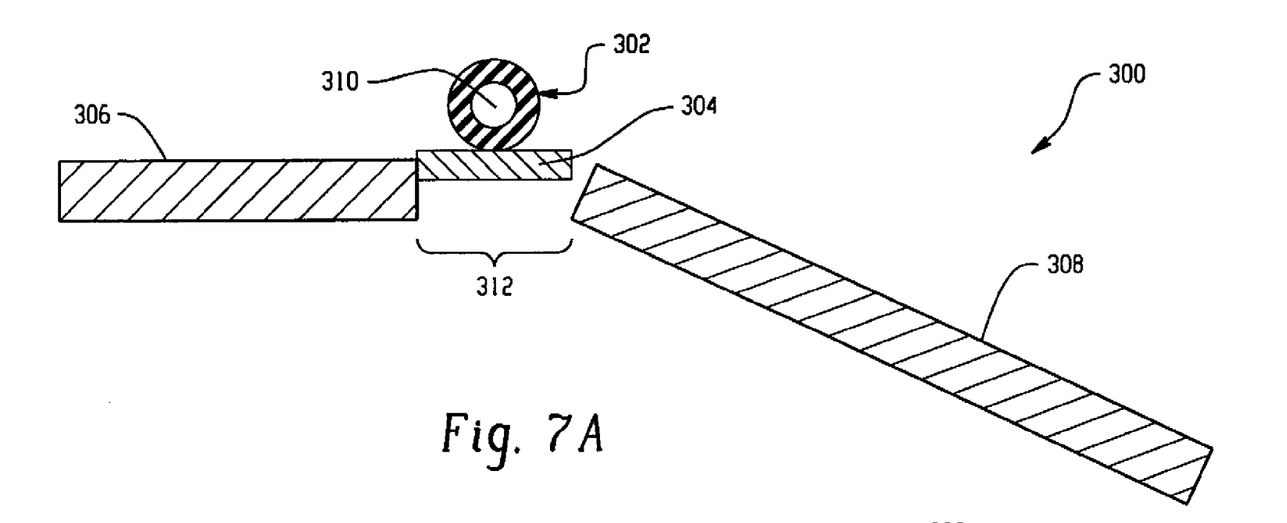
FIGS. 7A and 7B are cross-sectional views of another embodiment of an active material based concealment device for concealing a seam between a fixed panel and a moveable panel.
Figure 7B:
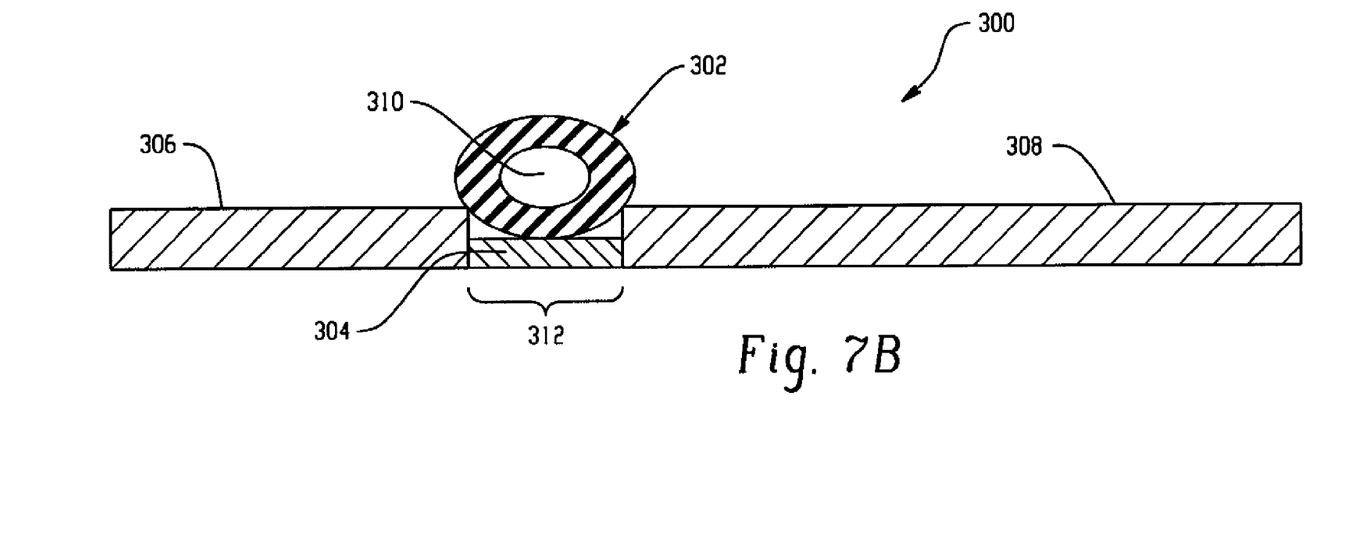

Finally, turning to FIGS. 7A and 7B, another exemplary embodiment of an active material based concealment device 300 is illustrated. The active material based concealment device 300 includes a seat 302 and an appearance panel 304 in operative communication with a fixed panel 306 and a movable panel 308 in the "open" position (as shown in FIG. 7(a)). The seal 302 further includes an active material 310, which may be embedded in or operatively connected to the seal 302. In order to conceal the seam 312 between the fixed 306 and movable 308 panels, the active material 302 undergoes a change in at least one property upon receipt of an activation signal. The change in at least one property can be preferably activated when the movable panel 308 is closed, for instance, or on-demand. This change in at least one property is effective to expand the seal 302, forcing the appearance panel 304 to advance from a retracted position (shown in FIG. 7(a)) to a position concealing the seam 312 (shown in FIG. 7(b) with the door closed). The appearance panel is used in this embodiment so that, when the seam 312 is concealed, the appearance panel provides a smooth, and optionally similar textured and colored, surface as the adjacent fixed and moveable panels 306 and 308. The appearance panel, however, is optional. The seal 302 could include a coating on its exterior to mask the seam 312, rather than an attached appearance panel.

The application and functionality of the active material based concealment device will determine which active material is best suited for the particular assembly. Factors such as force, displacement, actuation time, and the like can be used to determine which type of active material is most appropriate. For instance, where an application requires an activation time of about 1 second or greater, a SMA or SMP can be appropriate. Where an application requires shorter activation times, an EAP or MR elastomer can be used.

As stated above, the concealment devices as disclosed herein advantageously employ active materials to reversibly expose and conceal seams existing between two adjacent surfaces. The active material based concealment devices are lightweight, inherently robust, lower in complexity than existing seam concealment devices (which can have multiple mechanical and/or electrical components prone to failure), and produce little or no noise. Utilizing active materials to affect the movement of the moveable body of the devices provides them with increased simplicity, while reducing assembly volume and the energy requirements for activation due to higher energy densities. Moreover, the active material based concealment devices described herein are also low-cost and of easily adaptable design that can be integrated with limited changes to the existing structure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for concealing a seam between a first surface and a second surface comprising:
   a moveable body fixedly attached to a selected one of the first surface and the second surface, wherein the moveable body is configured to transition between a first position and a second position to conceal and expose the seam; and
   an active material in operative communication with the moveable body, wherein the active material is configured to undergo a change in at least one property upon receipt of an activation signal, wherein the change in at least one property is effective to transition the moveable body from the first position to the second position.

2. The device of claim 1, wherein the active material comprises a shape memory alloy, a ferromagnetic shape memory alloy, a shape memory polymer, an magnetorheological elastomer, an electrorheological elastomer, an electroactive polymer, a piezoelectric material, or combinations comprising at least one of the foregoing active materials.

3. The device of claim 1, wherein the change in the at least one property comprises a change in a shape, a dimension, a phase, a shape orientation, a stiffness, or combinations comprising at least one of the foregoing properties.

4. The device of claim 1, wherein the activation signal comprises a thermal activation signal, an electric activation signal, a magnetic activation signal, a chemical activation signal, a mechanical load, or a combination comprising at least one of the foregoing activation signals.

5. The device of claim 1, further comprising an activation device configured to provide the activation signal to the active material.

6. The device of claim 1, further comprising a zero-power hold mechanism configured to hold the moveable body in a selected one of the first position and the second position upon deactivation of the activation signal.

7. The device of claim 1, further comprising a bias mechanism configured to return the moveable body from a selected one of the first position and the second position upon deactivation of the activation signal.

8. The device of claim 1, wherein the moveable body is stored in a groove in a selected one of the first surface and the second surface when the seam is exposed.

9. The device of claim 7, wherein the bias mechanism comprises a coil spring disposed between the moveable body and the selected one of the first or the second surface.

10. The device of claim 1, wherein the active material comprises a wire disposed between the moveable body and the selected one of the first or the second surface.

11. The device of claim 10, wherein the active material comprises a plurality of wires that are each fixed to the moveable body and the selected one of the first or the second surface.

12. The device of claim 10, further comprising a bias mechanism configured to return the moveable body from a selected one of the first position and the second position upon deactivation of the activation signal.

13. The device of claim 12, wherein the bias mechanism comprises a coil spring disposed around the wire and between the moveable body and the selected one of the first or the second surface.

* * * * *